United States Patent
Brantmark et al.

(10) Patent No.: US 9,069,351 B2
(45) Date of Patent: Jun. 30, 2015

(54) SYSTEM AND A METHOD FOR CONTROLLING MOVEMENTS OF AN INDUSTRIAL ROBOT

(75) Inventors: Håkan Brantmark, Västerås (SE); Mattias Falk, Malmö (SE); Görgen Johansson, Västerås (SE)

(73) Assignee: ABB RESEARCH LTD., Zürich (CH)

( * ) Notice: Subject to any disclaimer, the term of this patent is extended or adjusted under 35 U.S.C. 154(b) by 2191 days.

(21) Appl. No.: 11/791,760

(22) PCT Filed: Nov. 7, 2005

(86) PCT No.: PCT/SE2005/001676
§ 371 (c)(1),
(2), (4) Date: May 29, 2007

(87) PCT Pub. No.: WO2006/057591
PCT Pub. Date: Jun. 1, 2006

(65) Prior Publication Data
US 2008/0091301 A1  Apr. 17, 2008

(30) Foreign Application Priority Data
Nov. 26, 2004  (SE) ...................................... 0402891

(51) Int. Cl.
*B25J 9/16* (2006.01)
*G05B 19/4155* (2006.01)
*G05B 19/418* (2006.01)

(52) U.S. Cl.
CPC *G05B 19/41825* (2013.01); *G05B 2219/32159* (2013.01); *G05B 2219/32247* (2013.01);
(Continued)

(58) Field of Classification Search
CPC . B22D 11/204; B22D 11/201; B25J 15/0491; B25J 9/1679

USPC .............................................. 700/245; 901/2
See application file for complete search history.

(56) References Cited

U.S. PATENT DOCUMENTS 4,543,639 A  9/1985  Inaba et al.
5,019,762 A *  5/1991  Kato ............................. 700/247
(Continued)

FOREIGN PATENT DOCUMENTS

EP    0807497 A1   11/1997

OTHER PUBLICATIONS

PCT/ISA/210—International Search Report—Jan. 31, 2006.
(Continued)

*Primary Examiner* — John Q Nguyen
*Assistant Examiner* — Kyung Kim
(74) *Attorney, Agent, or Firm* — Venable LLP; Eric J. Franklin; Jeffri A. Kaminski

(57) ABSTRACT

A system and a method for controlling movements of an industrial robot during a work cycle including visiting and performing work on a plurality of workstations in a work cell. The system includes a set of predefined workstations. Each workstation includes preprogrammed robot code adapted to the workstation, an entry point defining the entrance position to the workstation, and one or more predefined paths to be followed by the robot at the workstation. A user interface is adapted to provide information about the predefined workstations and allows an operator to select one or more of the predefined workstations and to specify a desired part flow between the workstations. A scheduling unit is adapted during execution of the work cycle to schedule the execution order for the workstations based on the workstations selected from the predefined workstations and the desired part flow, and to control the movements of the robot based on the scheduled execution order and the predefined paths.

41 Claims, 5 Drawing Sheets

(52) U.S. Cl.
 CPC ............... *G05B2219/40097* (2013.01); *G05B 2219/40113* (2013.01); *G05B 2219/40308* (2013.01); *G05B 2219/45137* (2013.01)

(56) References Cited

U.S. PATENT DOCUMENTS

| | | | |
|---|---|---|---|
| 5,483,440 A * | 1/1996 | Aono et al. | 700/56 |
| 5,850,342 A | 12/1998 | Nakamura et al. | |
| 5,930,461 A | 7/1999 | Bernstein et al. | |
| 6,463,360 B1 * | 10/2002 | Terada et al. | 700/257 |
| 6,654,666 B1 | 11/2003 | Terada | |

OTHER PUBLICATIONS

PCT/ISA/237—Written Opinion of the International Searching Authority—Feb. 2, 2006.
PCT/IPEA/409—International Preliminary Report on Patentability—Feb. 27, 2007.
Supplementary European Search Report—Jun. 24, 2011.

* cited by examiner

SYSTEM AND A METHOD FOR CONTROLLING MOVEMENTS OF AN INDUSTRIAL ROBOT

CROSS-REFERENCE TO RELATED APPLICATIONS

This application claims priority to Swedish patent application 0402891-6 filed 26 Nov. 2004 and is the national phase under 35 U.S.C. §371 of PCT/SE2005/001676 filed 7 Nov. 2005.

FIELD OF THE INVENTION

The present invention relates to a system. The invention also relates to a method for controlling the movements of an industrial robot during a work cycle including visiting and performing work on a plurality of workstations in a work cell.

PRIOR ART

Before an industrial robot is to be put in operation for a certain task, it must be programmed to carry out the task. The person controlling a robot is denoted an operator. When programming an industrial robot, a robot language is used. There exist a plurality of different robot languages, since each robot supplier has developed its own robot language. A robot program comprises a series of robot instruction written in the robot language. The use of a programming language offers the advantage of great flexibility, but also requires that the operator, who is programming the robot, must have knowledge of robot programming, and in particular of the robot language of different robots. However, in industry it is not always possible to have operators with knowledge of robot programming. Thus, it is a desire to make it possible for operators without any knowledge of programming language to program the robot in a simple and intuitive way.

Robots are usually placed in robot cells or lines, in order to facilitate the automation of a complex series of actions. The robot cell may comprise a number of different workstations, including machines, process units and/or other equipment, and the robot is programmed to perform different tasks at the different workstations.

Programming of a robot includes programming the robot to perform a work cycle in accordance with an application served by the robot. Within robotized manufacturing, materials and components are moved between the different workstations. Normally, the process follows a certain pattern, which depends on a desired part flow. The part flow is the order in which a part, e.g. a workpiece, should be handled by different machines and process units. To control the movements of the robot when it moves between the workstations in a robot cell, a robot program is written in advance describing in detail the necessary movements of the robot to perform the work cycle. The robot program also has to take into account events, such as faults or emergency stop, occurring during execution of the robot cell. This means that a plurality of different paths have to be programmed in advance to cover all necessary movements of the robot.

However, in industry, the manufacturing process often changes, for example when a new type of part is to be produced, and then the robot cycle has to be adjusted. Adjusting the robot cycle means that the robot has to be reprogrammed, i.e. the robot program has to be rewritten. This reprogramming is time consuming and sometimes difficult to do since a large number of program routines has to be changed.

OBJECTS AND SUMMARY OF THE INVENTION

The object of the present invention is to provide an attractive solution, which alleviates the problems mentioned above, and which makes it easy for an operator to program a robot to execute a new work cycle and makes it quick and easy for the operator to make adjustments of an existing robot program.

According to the invention this object is achieved by a system.

A workstation is a physical location on which the robot may carry out work. According to the invention, a set of predefined workstations is stored in a memory location. Each predefined workstation represents a real workstation, including a specific type of machine or equipment, and a defined task to be carried out by the robot at the workstation. The predefined workstation is a model of the real workstation and comprises preprogrammed robot code, an entry point defining the entrance position to the workstation, and one or more predefined paths to be followed by the robot at the workstation. The preprogrammed robot code is specially designed for controlling the robot so that it carries out the defined task at the workstation and the code is adapted to the specific type of machine or equipment of the workstation.

Examples of workstations are: an injection mould machine, a die-casting machine, a scrap station for throwing away rejected parts, a device for vision control of the part, one or more stations for subsequent treatment of the part, and an output station such as a conveyer. Examples of tasks are: pick a moulded object from the mould, throw the object in the wastebasket, hold the object during a vision control, move the part in a predefined way in relation to a treatment tool, put the part in an assembly with other parts, place the part on the conveyor. The subsequent treatment is for instance flaming, deburring, degrading, dispensing, polishing, grinding or painting.

The operator creates a robot program by selecting one or more workstations from the predefined set of workstations and specifying a desired part flow between the workstations. The part flow is the order in which a part should be processed by the workstations. The user interacts with the user interface during creation of the robot program. A robot program is generated based on the stored, predefined workstations including predefined robot program code, and information entered by the operator. The predefined workstations includes predefined movement path for carrying out the task. This helps the operator, who does not need to bother about programming complicated movements at the workstations.

The system further comprises a scheduling unit, which is adapted, during execution of the work cycle, to schedule the execution order for the workstations based on the workstations selected by the operator and the part flow input by the operator, and to move the robot based on the scheduled execution order and the predefined paths. The scheduling makes it possible to automatically modify the execution order for the workstations during execution of the work cycle and thus makes it possible to let the robot work asynchronously with the different work cells.

The invention makes it possible for an operator without any knowledge of robot programming to program a work cycle for a robot. The invention makes it easy for an operator to make adjustments in the work cycle in connection with adding and removing workstations to the robot cell, and to make changes in the part flow. The part flow can easily be changed without any recoding, and workstations can be added and removed from the work cell without any recoding. The operator does not have to do any changes in the program code when reprogramming the robot. The only thing the operator has to do is to select one or more new workstations from the set of predefined workstations and input a new desired part flow.

According to an embodiment of the invention the system is adapted to receive information about external events and the scheduling unit is adapted to determine which of the workstations to be executed next based on said information about external events. External events are for example changes in the status of the workstation, for instance that a machine is ready to be loaded, a machine is ready to be unloaded, or a workstation is not ok, due to the fact that an error has occurred in a machine. According to this embodiment the execution order is event-driven. The execution order is determined in run time, instead of in advance as in prior art robot systems. Thus, the work cycle for the robot does not have to be programmed in advance. Another advantage with this embodiment is that the execution order will automatically change in run time when something goes wrong or a workstation is not ready. Thus, it is not necessary for the operator to intervene.

According to an embodiment of the invention the system is adapted to receive information regarding the status of the workstations and the scheduling unit is adapted to determine which of the workstations to be executed next based on the current status of the workstations. In particular, the system is adapted to receive information regarding changes in the status of the workstations. If the scheduling unit knows the current condition of the workstations and the desired part flow, the scheduling can be done generically, which in turn provides that the part flow can easily be changed without any recoding.

When the robot is allowed to work asynchronously there is a risk of deadlocks, for instance if the robot has extracted a part from a die-cast machine and has to place it in a trim machine, but the trim machine is not ready to be loaded because it has not yet finished trimming the previous part. To avoid this there must be some sort of buffer station, where the parts can be temporarily placed waiting for the machine to be ready.

According to an embodiment of the invention the system is adapted to provide a possibility to point out an alternative workstation to be executed if the ordinary workstation is not ready to be executed, and that said scheduling unit is adapted to determine which of the workstations to be executed next based on pointed-out alternative workstations. Thus, if a station is not ready to process a part, the robot moves to the alternative station. The alternative workstation may be a parallel workstation which reduces the cycle time of the work cycle. In this way failures and delays can be handled automatically in a predefined way.

According to an embodiment of the invention the system is adapted to provide a possibility to assign different priorities to the chosen workstations, and that said scheduling unit is adapted to determine which of the workstations to be executed next based on the assigned priorities. This embodiment makes it possible to have different machines that work with different parts in parallel to increase the output from the workcell. For instance, when one part is machined in a saw station, another part is extracted from a die-cast machine.

According to an embodiment of the invention each of said predefined workstations comprises a model of a real workstation including a software object having an interface with one or more properties, methods and events, and the object is adapted to interact with the surroundings through its properties, methods and events. Each workstation is modeled as an object independent of the other stations in the workcell. This embodiment makes it easy to create new workstations.

According to an embodiment of the invention said properties include the status of the workstation.

According to an embodiment of the invention said properties include the alternative workstation to the workstation.

According to an embodiment of the invention said properties include the priority of the workstation.

According to an embodiment of the invention said methods include one or more interrupt routines defining what to do when a specific interrupt signal arrives and said scheduling unit is adapted to execute the interrupt routine upon receiving the specific interrupt signal.

According to an embodiment of the invention the interface has an event adapted to trigger on a change in a signal corresponding to the status of the workstation and based thereon to update the status of the workstation.

When a fault occurs during a work cycle, it is desirable that the robot is automatically moved out of the workstation and then moved to a predefined home position, which preferably is the starting point of the work cycle. From this position a new work cycle should be started as soon as possible.

According to an embodiment of the invention said predefined paths comprise a predefined station path defining the robot movement into and out of the workstation, wherein the station path comprises an entrance path defining the robot movement from the entry point to a process point defined inside the workstation and an exit path defining the robot movement from the process point out of the workstation. In order to get a structured way to programming the workstations, the robot movements within the workstations are structured into predefined categories of paths. Due to the fact that there are predefined entrance and exit paths for all workstations it is possible to automatically move the robot out of the workcell when an error has occurred.

According to an embodiment of the invention said predefined paths comprise at least one predefined process path defining the robot movement inside the workstation, wherein the process path comprises a second entrance path defining the robot movement from said first process point to a second process point defined inside the workstation and a second exit path defining the robot movement from the second target point back to the first process point.

According to an embodiment of the invention said predefined paths comprise an array of predefined path points and said scheduling unit is adapted to retrieve the path points from said array upon execution of the path. Due to the fact that the path points on the predefined paths are stored as an array of points, it is possible to move the robot forward as well as backward along the predefined paths. This is advantageous, for instance, when an error has occurred.

According to an embodiment of the invention said predefined path points comprise information about whether the point is a move-in or a move-out point, and the type of movement in the point, e.g. whether it is a linear or a joint movement. This information teaches how the robot should be moved between the path points. This information is also useful during fault recovery.

According to an embodiment of the invention said set of predefined workstations comprises at least one predefined work cell comprising: an entry point of the work cell defining the entrance position to the work cell, predefined paths to be followed by the robot between the entry points of the workstations, and predefined paths to be followed by the robot from each entry point of the workstations to the entry point of the work cell. Preferably, the entry point of the work cell is the home position of the robot. What fault recovery all comes down to is to move the robot to home position safely and as fast as possible. This embodiment makes it possible to automatically move the robot to the home position from each workstation in the workcell.

According to an embodiment of the invention said predefined work cell comprises a model of the real work cell including a software object having an interface with one or more properties, methods and events, and the object is adapted to interact with the surroundings through its properties, methods and events and that the software object of the cell has the same interface as the software objects of the workstations. According to this embodiment the workcell itself is modeled as a station object.

According to an embodiment of the invention the scheduling unit is adapted, upon receiving a fault interruption signal, to move the robot out of the workstation and to the entry point of the work cell by moving the robot along said predefined paths in dependence on the current position of the robot. A condition for this is that the scheduling unit knows in which workstation the robot is, and on which of the predefined path the robot is when the fault occurred. Then, it is always possible to safely and automatically move the robot back to the home position when a fault has occurred.

According to an embodiment of the invention the scheduling unit is adapted to move the robot along said predefined paths in dependence on one or more predefined rules. For example, the rules comprises, in case the failure occurs when the robot position is on the entrance path, the robot will reverse on the entrance path, and in case the failure occurs when the robot position is on the exit path the robot will continue to follow on the exit path. According to this embodiment faults are handled without prior specific programming of various failure cases.

According to one aspect of the invention this object is achieved by a method.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network.

According to another aspect of the invention, the object is achieved by a computer readable medium having a program recorded thereon, when the program is to make a computer perform the steps of the method according to the invention, and said program is run on the computer.

The invention is useful for programming and controlling industrial robots for any application including visiting and performing work on one or more workstations. The invention is particularly useful for programming robots in connection with handling moulded parts from moulding machines, for example in connection with injection moulding, die-casting, well machine tending and material handling in general.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

In the following the invention will be described in a relation to a die-casting machine. However, the invention is not limited to applications including die-casting machines. On the contrary, the invention is just as well applicable for any applications including visiting and performing work on one or more workstations.

Figure 1:
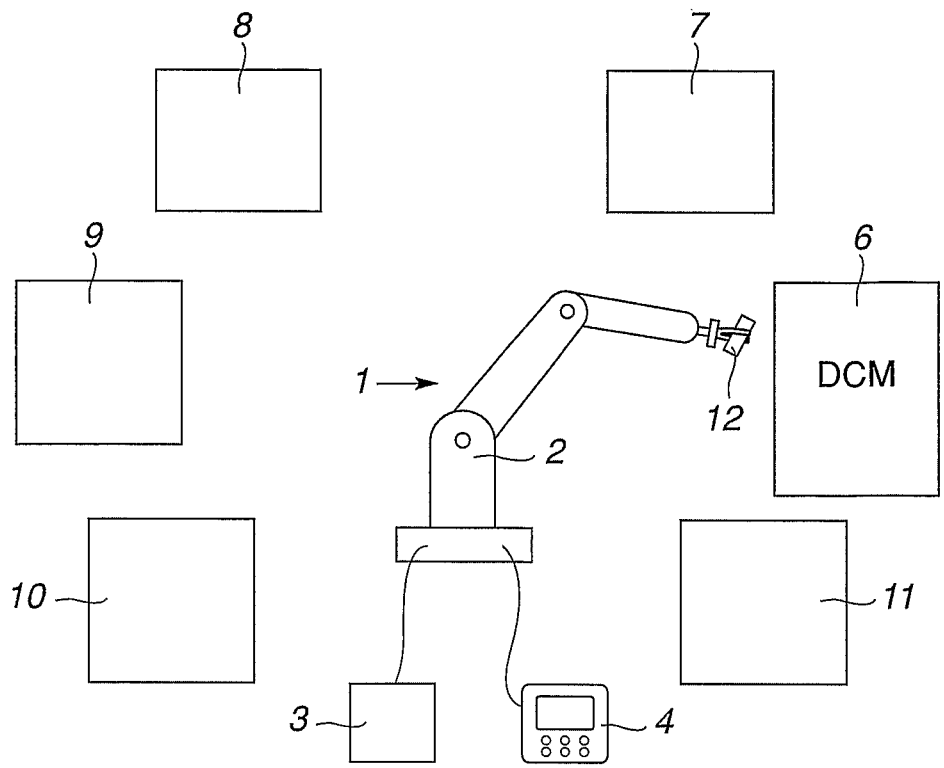
FIG. 1 shows an industrial robot carrying out a work cycle including moving a part between a plurality of workstations.

FIG. 1 shows work cell comprising an industrial robot 1 and a plurality of workstations 6-11. The industrial robot 1, comprises a manipulator 2, a control unit 3 for controlling the manipulator, and a portable operator control device 4, denoted a teach pendant unit, for teaching and manually operating the manipulator. The teach pendant unit 4, as well as the control unit 3 of the robot, comprises one or more processors and other hardware necessary for the implementation of the invention. According to a preferred embodiment of the invention the system is partly implemented on the teach pendant unit and partly implemented in the control unit. Preferably, the parts of the system dealing with the user interface are located in the teach pendant unit, and the parts dealing with the scheduling of the workstations and the control of the robot movements are implemented in the control unit. For example, the scheduling unit and the memory location for the predefined workstations are implemented in the control system, and a graphical generator and a memory location for storing information about the configuration of the user interface are implemented in the teach pendant unit.

The robot performs a work cycle including visiting and performing work on the workstations 6-11. The workstations are, for example, a die-casting machine (DCM) and surrounding equipment for handling or machining the parts produced in the die-casting machine. The workstations are for example a die-casting machine 6, a cooling device 7, a sensor for checking the part 8, a trimming machine 9, a sawing machine 10, and an out feeder conveyor belt 11. In the figure the robot holds a part 12.

A typical robot cycle for serving a die-casting machine includes several or all of the following tasks:
  picking and inserting cylinder liners into the mould of the die-casting machine,
  extracting the die-cast part from the die-casting machine,
  moving the part to the cooling station,
  checking the part with some sort of sensor,
  moving the part to a trimming machine,
  moving the part to a sawing machine,
  placing the finished part on a pallet station, and
  placing the finished part on an out feeder conveyor belt.

Figure 2:
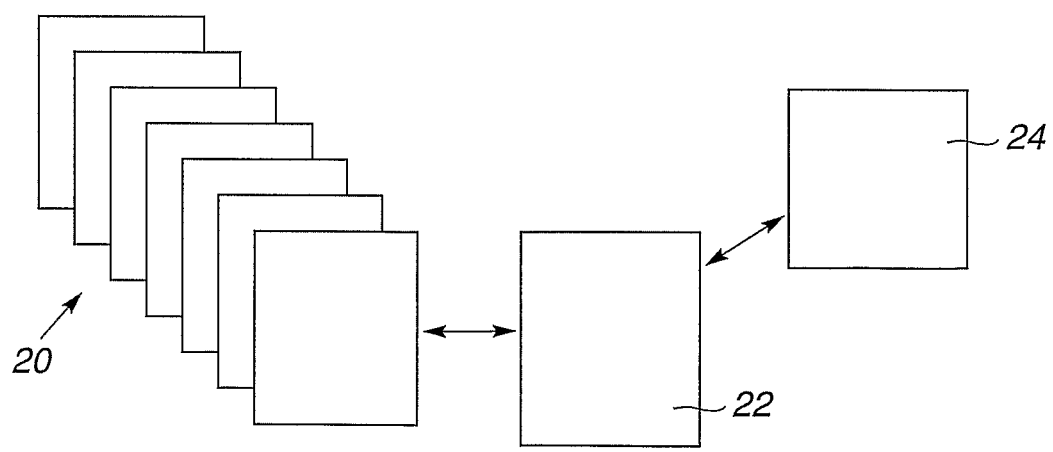
FIG. 2 shows the main features of a system according to the invention.

FIG. 2 shows the main features of a system according to the invention. The system comprises a library 20 of predefined workstations comprising preprogrammed robot code adapted to a specific type of machine or equipment, a scheduling unit 22 adapted to schedule the execution order for the workstations based on workstations chosen from the library and moving the robot based on the scheduled execution order and a desired part flow, and user interface 24, adapted to provide information to an operator about the predefined workstations and allowing the operator to select one or more of the predefined workstations and to specify a desired part flow between the selected workstations. The user interface is, for example, the teach pendant unit 4 of the robot.

The functionality of a workstation is installation specific, e.g. a die-casting machine is provided with or without an insert, a quench is provided with or without a fixture, and the customer wants a signal to be set at a certain point in time. This differs a lot and software that can handle all different customer demands in a generic way would be very complex and difficult to maintain. The idea according to the invention is instead to model a workstation as an object with properties, methods and events. The properties, methods and events are the interface to the surroundings. The library 20 comprises a plurality of objects representing different workstations, for example one object represents the die-casting machine, and other objects representing the trimming machine, the sensor, the sawing machine, the pallet station, the conveyor belt and the cooling station.

The workstations should be executed in a certain order, which depends on the desired part flow. The part flow is the order in which a part should be processed by the workstations in the workcell. During the work cycle, the robot moves between the workstations and moves in and out of the workstations. A task for the scheduling unit is to keep track of the current condition of the workstations. Another task for the scheduling unit is to keep track of the current position of the robot. The scheduling unit determines the next station for the robot to be moved to based on the part flow input by the operator. The part flow is stored in a string array. When the scheduling unit has determined which workstation to be executed next, the robot is moved to the next station along a predefined path, and when the robot has been moved to the next station the predefined robot code of the station is executed.

Figure 3:
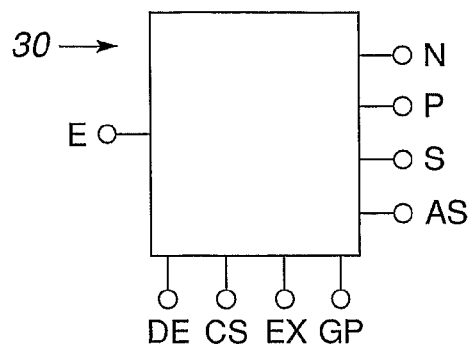
FIG. 3 shows an example of a predefined workstation.

FIG. 3 shows a predefined workstation 30, which is a model of a real workstation. The workstation model is a software object, in the following denoted a station object, having an interface with properties N, P, S, AS, methods DE, CS, EX, GP, and events E adapted to interact with the surroundings. Each station object is made independent of the other workstation in the work cell. A station object interacts with the surroundings through its properties, methods and events. The station object is a program module and could be programmed in any program language, allowing object programming. For example the station objects are programmed in robot code. In this embodiment the station object has the following properties: name N, priority P, status S, alternative station AS.

The property "name" is the name of the workstation. The property "priority" is used during scheduling to determine which station to be executed next. The priority is a number ranging from one up to a maximum number. Preferably, the operator sets the priority of the workstations. To make the robot cell in FIG. 1 cost efficient, the die-casting machine should have the highest priority, which means that the die-casting machine should never have to wait for the robot to serve another machine.

The property "status" is dynamic and changes during run time. The status can, for example, be assigned: workstation is ready to be loaded, workstation is ready to be unloaded, workstation is busy at the moment, but will in a while be ready to be unloaded, station is busy at the moment but will in a while be ready to be loaded, and station is not okay, which means that the workstation is in a failure state.

Another important property is "alternative station", which is the name of the workstation to be executed if the current station cannot be executed. For example, if the station is in a failure state, not ready to be loaded, or unloaded, the next station to be executed is the alternative station of the station. For instance, the alternative station to a trimming station could be a scrap station. It is also possible to have more than one station of the same type, for example to have a first and a second trimming station, wherein the second trimming station is the alternative station for the first trimming station and vice verse.

A station object must always have a predefined station path, and could besides the station path have an arbitrary number of process paths. Any processes like grinding or spraying may require one or several secondary path starting from and ending in the primary process position. Each path comprises an entrance path, a process position, and an exit path. A path is defined as an array of path points and could have an arbitrary name. A path may comprise different types of path points such as an entry point, a process point, a move in point, or a move out point. A path point is described by the following properties: the type of point, the type of movement in the point, i.e. weather it is a linear or a joint movement, the position of the point, the speed of the robot to the point, the zone around the point, and the name of an attached procedure. The attached procedure will be executed when the robot arrives at the path point.

Figure 4:
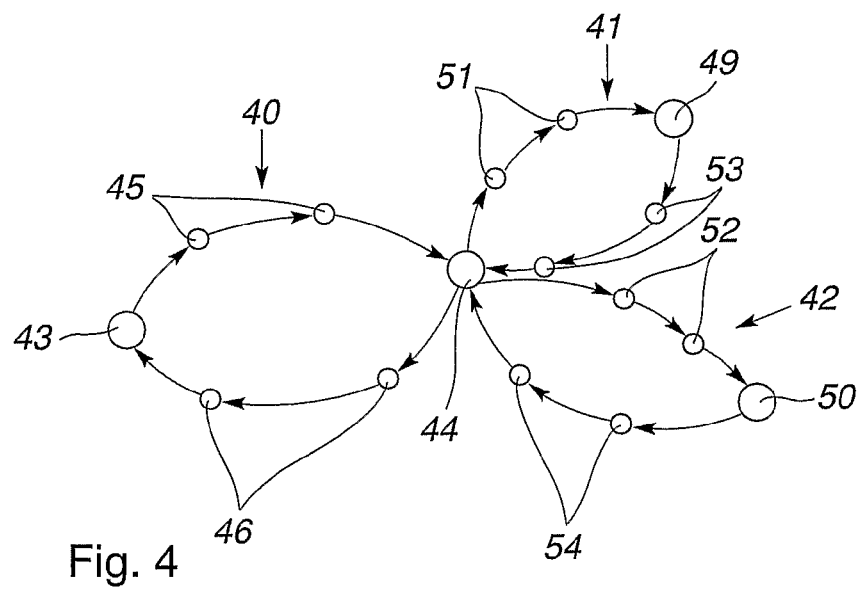
FIG. 4 shows an example of a predefined path for a workstation.

FIG. 4 shows examples of predefined paths for a workstation. The paths include a station path 40, a first process path 41, and a second process path 42. The station path 40 includes an entry point 43, defining the entrance position to the workstation, a process point 44, which is a point defined inside the workstation, move in points 45, and move out points 46. The station path includes an entrance path defining the robot movements from the entry point 43 to the process point 44 and an exit path defining the robot movements from the process point 44 and back to the entry point 43.

The entry point for the first 41 and second 42 process path is the process point 44 for the station path. The process path 41 also includes a process point 49, move in points 51, and move out points 53. The process path 42 also includes a process point 50, move in points 52, and move out points 54. The robot has to finish a process path before it can start moving on another process path. For example, the robot can not move to the first process path process point 49 and from there start moving on the second process path. The robot has to move back to the entry point 44 of the first process path before it can start moving on the second process path 42. For each workstation an entrance path defining the robot movement into the workstation, and an exit path defining the movement for the robot to leave the processing point have to be defined.

If a workstation should do anything like checking its status, unloading a part, or returning a path, the methods of the station object are called. The station object shown I FIG. 3 has the following methods as default:
    a method that defines interrupts and connect the interrupts to interrupt routines,
    a method that deletes interrupt.

a method for resetting a station, for example after a fault the signals of the station have to be reset before the production can continue, a method for checking the status of the workstation; this method includes logic that sets the status of a station, and is preferably implemented in a procedure, and not directly in an interrupt routine because it makes it possible to run the check status methods remotely, one or more methods for executing a process by the workstation, for example a method for unloading and/or loading the workstation. If a station is scheduled as the next station to be served by the robot the method execute is called.

a method called get path. This method sets the argument path to "station path", "process path 1", or "process path 2". The method get path is used during fault recovery, and if a station has more than one process paths the method get path returns a value showing which path the robot is moving on at the moment.

It is important that the values of the arguments be updated according to where the robot is. For example, a workstation has a cooling rack with ten shells. Such a station includes a station path, ten unload path and ten load path. Thus the station includes twenty-one paths.

Figure 5:
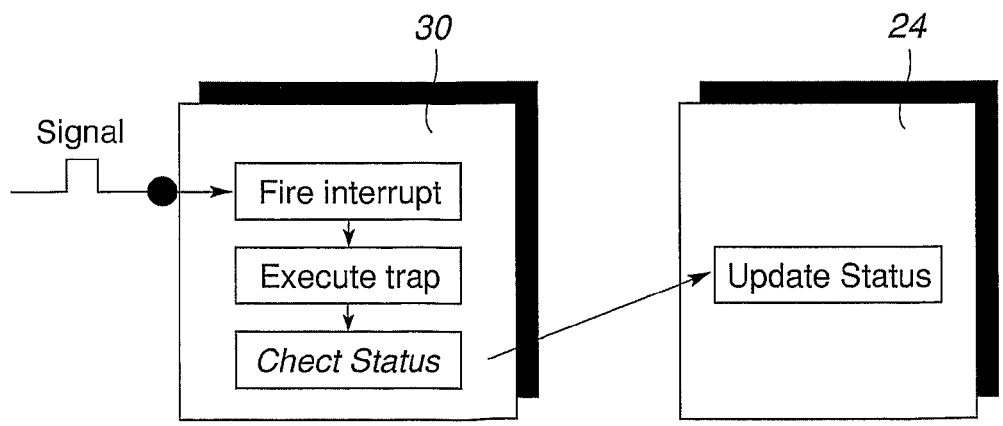
FIG. 5 shows how an interrupt signal to a station object will be handled.

The events of a station object are interrupts defined to trigger on a signal change. If an interrupt affects a station's status, the interrupt has to be connected to an interrupt routine and the interrupt routine must in turn execute the method check status. FIG. 5 shows how an interrupt signal to a station object 30 will be handled. An interrupt signal fires an interrupt connected to an interrupt routine. The interrupt routine executes the method check status, which updates status of the station in the scheduling unit 24.

Figure 6:
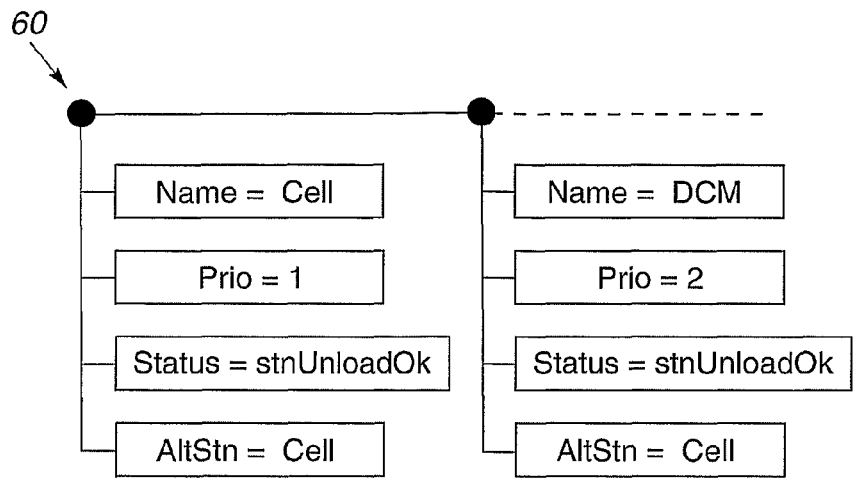
FIG. 6 shows an example of xctStation-list.

The scheduling unit could be seen as the brain and motor of the workcell. Its responsibilities are to ensure a correct and fluent scheduling of the workstations, to secure a valid fault recovery and to provide a set of constants, routines and events, which are used in the programming of the stations. The bottom line when it comes to scheduling is to pick the station to be executed next, based on the status of the stations, a define part flow, the history of the part and the status of the robot tool. In order to get the status of a station, the scheduling unit has an array, denoted xctStation-list, which holds, for all stations, the name of the station, the priority of the station, the current status of the station, and the alternative station to the station. The stations alternative station is the name of the station to be executed if the station cannot be executed. FIG. 6 shows an example of xctStation-list 60. Whenever a station changes one of its properties, the station list is updated.

The status of the tool is, for example, tool is open or tool is closed. When the tool is open, the robot can grip a part, and then the only stations of interest are those that can deliver a part to the robot. Those stations are included in another list denoted a xctQ-list. For example, the xctQ-list only includes stations that will be or are ready to be unloaded.

To be able to schedule when the robot holds a part during normal production, it is necessary to know where the part has been and at which station the part is supposed to be next. For scheduling when a robot holds a part, the scheduling unit uses two variables: an array variable describing the part flow, denoted xctPf-list, and another variable holding the history of the parts, denoted xctPart. The variable holding the parts history holds the name of the part, the name of the station where it was last processed, and a Boolean telling the scheduling unit weather the part shall follow normal part flow or not.

Central to the scheduling is to know if the tool of the robot holds a part or not. A variable, denoted xctTool, of a custom defined type, holds the name of the tool and the status of the tool. Tools status can be either of the following three: open, closed and not okay.

The first thing the scheduling unit does during scheduling is to check the status of the tool. If the tool is open, the next station to be executed is picked from the xctQ-list with respect to priority and status. If the tool is closed, the next station to be executed is picked from the execute part flow list, based on where the part has been earlier (xctPart), and where it is supposed to be according to the part flow. The third condition the tool could have is to not be okay. This is a failure state that forces the scheduling unit to move the robot to its home position.

Figure 7:
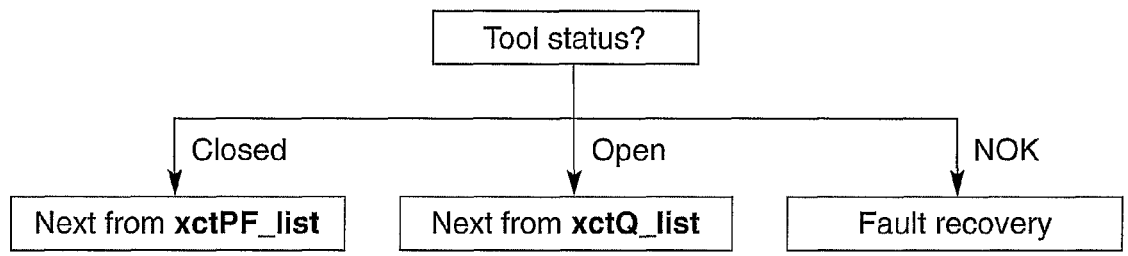
FIG. 7 shows an example of how the scheduling unit picks the next station to be executed.

Independent of weather the next station was picked from the xctQ-list or from the execute part flow list (xctPF-list), the result is that a variable, denoted NextStation, is assigned the next station to be executed. But before the schedule station can be executed, it is necessary to check the status of the next station, and then the robot is moved to the scheduled station. FIG. 7 shows how the scheduling unit, in dependence on the tool status, picks the next station to be executed from either one of the execute path flow list or the xctQ-list, or if the tool status is not okay execute a fault recovery procedure.

Figure 8:
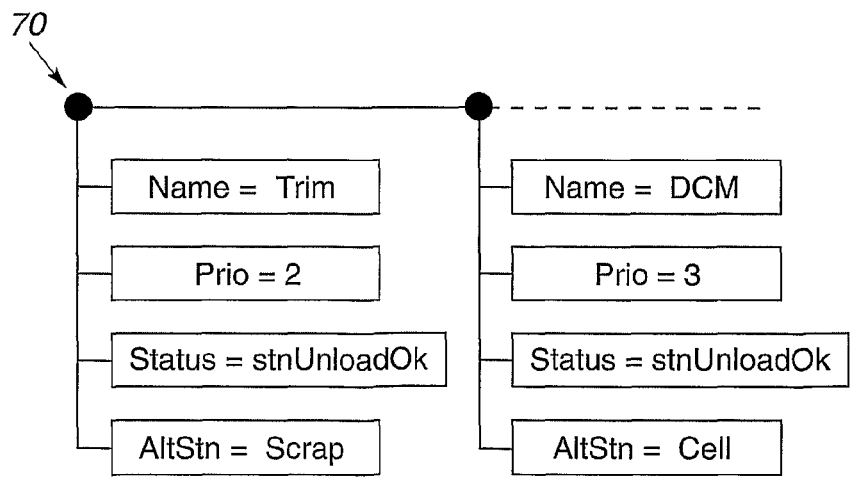
FIG. 8 shows an example of an xctQ-list.

In the following the scheduling when the tool is open will be described. When the tool is open the next station to be executed is picked from the xctQ-list. The stations that can either be unloaded directly, or can be unloaded in a while, are included in the xctQ-list. The stations are sorted in decreasing priority order in the xctQ-list. FIG. 8 shows an example of an xctQ-list 70. In this example both the trimming station, and die-casting station have the same status, but the trimming station has higher priority than the die-casting station and will therefore be scheduled as the next station to execute. A station with high priority, ready to unload is scheduled as the next station to execute. A station that is ready to be unloaded is scheduled before a station that is busy at the moment, but will be ready to be unloaded.

Figure 9:
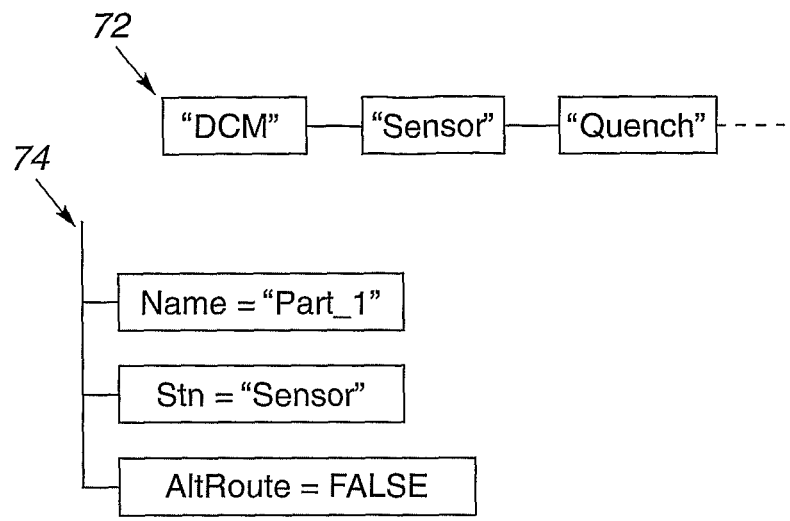
FIG. 9 shows an example of an execute part flow list showing the desired flow of the part.

In the following, scheduling when the tool is closed will be described. Scheduling when the tool is closed and the robot holds a part is based on at which station the part was last processed and where the part is supposed to be processed next, according to the defined part flow. FIG. 9 shows an example of an execute part flow list, showing the desired flow of the part. According to this example the robot should first visit the die-casting station and pick out the part and then the part should be moved to the sensor station, and when the sensor station is finished the part should be moved to a quench station. FIG. 9 also shows the current value of the variable xctPart. According to the xctPart variable, the part has latest been processed in the sensor station and shall follow the normal part flow, since the old route is set at false. Thus, the next station for the part will be, according to the part flow, the quench station.

It is possible to depart from the normal part flow and force a part to any station, by setting an object station of the xctPart variable to the name of the next station and setting the alternative route of the execute part variable at true. Thus, the wanted station will be executed and normal scheduling will then continue. Depart from normal part flow could, for example, be used by a sensor station. If a part is not sensed, something is wrong with the part and the part should not continue on the normal route, but instead it should be delivered to the scrap station.

Before the robot is moved to the scheduled station a check has to be made to ensure that it is possible to execute the scheduled stations entry point, and if not, the alternative station of the scheduled station is instead scheduled to be the next station to be executed. For example, let us say that the robot has picked a part from a cooling rack and the next station for the part, according to the part flow, is the trimming station. Thus, the trimming station is scheduled as the next station, and before the robot moves to the trimming station the status of the trimming station is checked. But the trimming station cannot receive a part because it is in a failure state, or there is already a part in the trimming station, then the alternative station to the trimming station will be executed instead.

When the robot has moved to and arrived at the entry point of the scheduled station, the status of the station is checked a second time. Depending on the status of the station, the scheduling unit either executes the scheduled station, waits at the entry point for the scheduled station to be executable, or executes the alternative station. Table 1 below will show what the executing unit will do depending on the status of the scheduled station and the status of the tool. Such a check is done twice, a first time before the robot moves to the scheduled station, and a second time when the robot has arrived at the scheduled station's entry point. Thus, a status change of the scheduled station will be caught.

TABLE 1

| Status of scheduled station: | Status of tool: | Result: | Remark: |
| --- | --- | --- | --- |
| stnLoadOk | tlClosed | Exe. scheduled stn. | |
| stnLoadOk | tlOpen | Not defined | When tool is open only stations that will be or are ready to be unloaded |
| stnUnloadOk | tlClosed | Exe. Alt. stn | Alternative station is executed. |
| stnUnloadOk | tlOpen | Exe. scheduled stn. | |
| stnB2BkmLdOk | tlClosed | Wait at Entry-point | In a while station will be ready to be loaded, wait at Entry-point. |
| stnB2BkmLdOk | tlOpen | Not defined | When tool is open only stations that will be or are ready to be unloaded |
| stnB2BkmUldOk | tlClosed | Exe. Alt. stn. | Alternative station is executed. |
| stnB2BkmUldOk | tlOpen | Wait at Entry-point | In a while station will be ready to be unloaded, wait at Entry-point. |
| stnNOK | tlClosed | Exe. Alt. stn and run to home position. | Something wrong with scheduled station. Try alternative station and run to home position. |
| stnNOK | tlOpen | Run to home position. | Something wrong with schedule station. Run to home position. |
| any | tlNOK | Run to home position. | Something wrong with tool. Run to home position. |

Figure 10A:
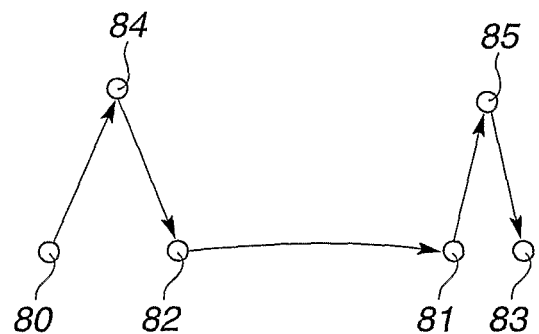
FIG. 10a shows an example of robot movements between two workstations.

Moving the robot between the workstation is taken care of by the scheduling unit. The robot is moved from a workstation's last point to the next station's entry point. FIG. 10a shows an example of robot movements between two workstations, wherein each station path includes an entry point 80, 81, an exit point 82, 83 and a process point 84, 85. According to this embodiment the entrance path starts at an entry point, and the exit path ends at an exit point. The robot is then moved from the exit point to the entry point of the next station.

Figure 10B:
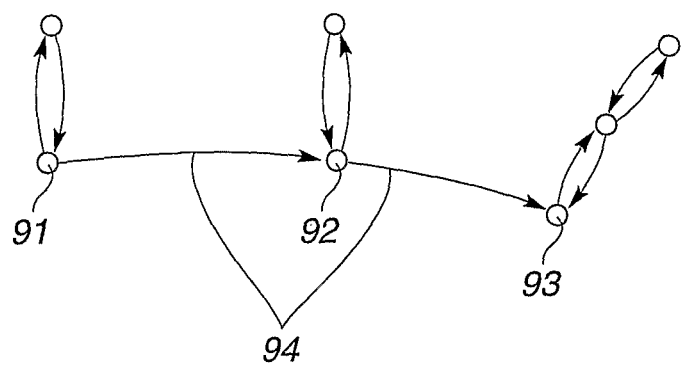
FIG. 10b shows an example of robot movements between three workstations.

FIG. 10b shows another embodiment of the invention in which the entry point 91-93 and the exit point of the station path are the same point. The path between the workstations is denoted the main path 94 and it goes between the entry points of the workstations. If not specifically defined, the robot selects the shortest way between the different entry points. If needed, the main path can be customized in order to avoid obstacles. The main path defines the main sequence of the process. For each station a secondary alternative station has to be defined. If a station is not ready to process the part the robot moves on to the alternative station. In this way, failures and delays can be handled automatically in a predefined way. If two stations are incompatible, it is possible to either define that the robot shall move via another station, or include a dummy station. The dummy station is nothing more than a point.

It is virtually impossible to make a process so robust that it does not interrupt or any failures occur. To avoid manual intervention it is essential to have an algorithm and a strategy that automatically redirect the robot in a predefined way. The failure handling is done according to a few simple rules. In the following the rules will be described in a general manner.

If the robot is on the main path, and the next schedule workstation is not ready to accept a new part, the robot will be directed to the alternative station of the scheduled station. If this station is also not available for processing, the robot will commence until the end of the chain that preferably could be a wastebasket or storage. If a failure occurs when the robot is inside a workstation there are three possible cases of failure occurrence:

1. During the movement towards a process point.
2. When the robot is in the process position.
3. When the robot is on its way out from the process position.

This applies to the station path as well as to any of the process paths.

If the robot is moving along the entrance path on its way towards the process position and a failure occurs, the robot will reverse along the entrance path, and bring the part, for example, to the scrap bin.

If a failure occurs when the robot is in the process position of the station path, the robot will follow the ordinary exit path. After reaching the exit point, the robot will, for example, commence to the scrap bin. If a failure occurs in a second process position, the robot will immediately go to the first process position of the station path via the exit path of the process path, and then for example to the wastebasket via the exit point, disregarding possible other secondary process points. If a failure occurs on the way from a process position, the ordinary exit path will be followed.

One object of the fault recovery is to move the robot to its home position safely and as fast as possible. If the robot holds a part in its tool, the robot should throw the part in the scrap bin, before moving to the home position. When the robot is in its home position all its axes are in its zero position. The home position is the initial position of the robot, i.e. the starting point of the workcell. Fault recovery is based on two major fundamentals, one is that the robot cell itself is modeled as a station object, and a second is that the scheduling unit at every given moment knows where the robot is, and can get information about which path the robot was on when the fault occurred. The first fundamental is used to tell the scheduling unit that the robot shall move to the home position. The second fundamental is necessary to know to be able to move the robot out of a workstation.

As mentioned before, the work cell itself is modeled as a station object. The work cell object has the same properties as the other station objects and the same methods as well. The entry point of the cell object is the home position. The robot must always have a station to put a part, for example a scrap beam to prevent that the robot moves to home position with the part. The status of the cell object is set at unload okay which tells the scheduling unit that the robot shall move to the home position, and eventually the work cell object will be scheduled as the next station to execute.

Figure 11:
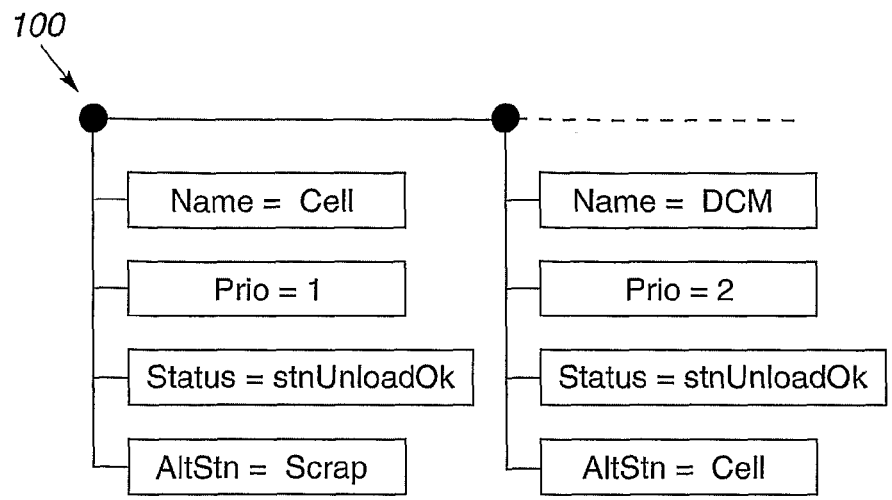
FIG. 11 shows an example of an xctQ-list including a cell station.

FIG. 11 shows an example of an xctQ-list including a cell station. In the figure the cell station has a higher priority than the die-casting station. The cell station will therefore be scheduled before the die-casting station, i.e. the robot will move to home position before entering the die-casting station. If there are stations that need to be unloaded before the robot moves to home position they need to have a higher priory than the cell station. According to the xctQ-list shown in FIG. 5, the cell station will, the next time a station is picked from the xctQ-list, be scheduled as the next station to be executed.

It is desirable for the robot to be able to move to home position from every point on any path in any workstation. For the scheduling unit to be able to move the robot to the home position from every point in the cell, it is required that the movements in a station be made with dedicated move-routines provided by the scheduling unit. The move-routines provided from the scheduling unit have two arguments. The first argument is a path ID, which tells the scheduling unit about the type of the path, and the second argument is the path itself. The scheduling unit defines four different path IDs:
1. Robot on main path, which is used internally in the scheduling unit when the robot moves between the stations.
2. Robot on station path, which indicates that the robot is on the station path on its way into and out of the workstation.
3. Robot on process path 1, which indicates that the robot is on the first process path of the workstation.
4. Robot on process path 2, which indicates that the robot is on the second process path of the workstation.

Figure 12:
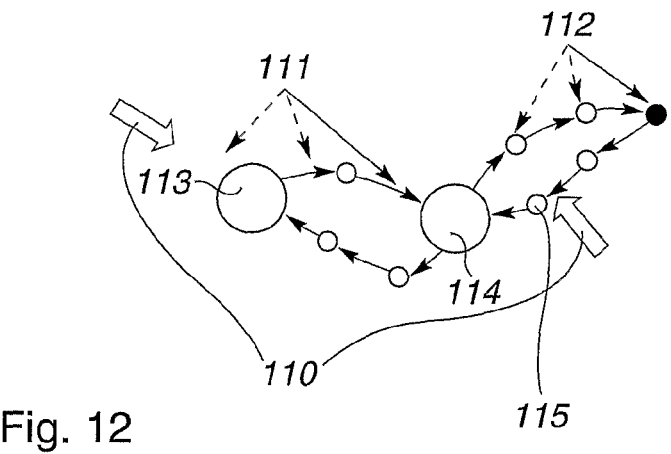
FIG. 12 shows how the variables PathPointer, PointAtMain, and PointAtSub change while the robot moves from the station's entry point to its process point.

To keep track of which path the robot is on, the scheduling unit has a variable, denoted PathPointer. The PathPointer can be assigned any of the path IDs described above. The scheduling unit also needs to keep track of at which path point the robot is. Thus, two further variables are needed, the first variable points at the station path, denoted PointAtMain, and the second variable points at any of the process paths, denoted PointAtSub. FIG. 12 shows how the PathPointer, PointAtMain, and PointAtSub change while the robot moves from the station's entry point to its process point.

Since the robot knows from the scheduling in which station the robot is, or will be, and it is known in which station the robot was last, the scheduling unit has all information needed to be able to run the robot to the home position from every position in the cell.

Figure 13:
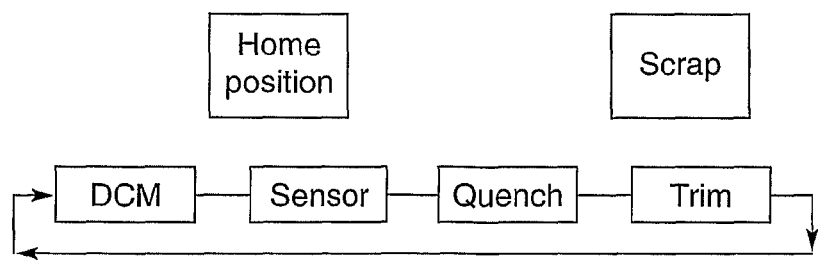
FIG. 13 shows an example of a work cell layout and a part flow.

FIG. 13 shows an example of a work cell layout and a part flow.

The following example explains how the home running works. Assume that the robot is in a die-casting station at point four 115 on the first process path in FIG. 12 when a fault occurs that requires the robot to run to home position. At first, the robot reads in at which station the robot is, and on which path. This information is received from xctNextStation and from PathPointer. In accordance with this information the scheduling unit calls the appropriate get path method to get the path. In this case the scheduling unit calls the method get path of the die-casting station in order to get the first process path. The scheduling unit uses the variable PointAtSub to get at which point to start the home running must. Since point four 115 is a move out point, the robot will move to the end of the process path, i.e. to the process point 114 of the station path. When the robot reaches the end of the process path, a second call to the method get path is done, this time in order to get the station path, in this case the station path of the die-casting machine station.

For the station path the scheduling unit uses the PointAtMain variable to get where to start on the station path. The robot moves to the end of the station path i.e. to the entry point 113 by following the exit path of the station path. When the robot is out of the station a scheduling is done, and since the status of the cell station was set at active when home running started, the cell station will be scheduled as the next station which means that the robot will move to the home position.

There are basically three types of faults:
1. Station faults, which occur when the status of the station is not okay.
2. Predictable faults, which are faults that occur at a certain position in the code, for example a watchdog exceeds its maximum time.
3. Unpredictable faults, for example emergency stops and joint errors. This type of faults terminates execution and restart is required.

The same rule will apply to all three types of faults and the rule is: Move the robot to home position before continuing production. If the robot holds a part at the fault occurrence, scrap the part and then move to home position.

The present invention is not limited to the embodiments disclosed but may be varied and modified within the scope of the following claims. For example, it is possible to use an external computer to implement the invention. It is also possible to control the movements of a plurality of manipulators with a common system according to the invention.

The invention claimed is:
1. A system for controlling the movements of an industrial robot during a work cycle, wherein the robot visits and performs work on a plurality of workstations in a work cell during the work cycle, the system comprising:
   hardware configured to store a library of predefined workstations, wherein each of said predefined workstations comprises:
      a model of a real workstation including a specific type of machine or equipment at each workstation,
      preprogrammed code designed to control the robot so that the robot carries out a defined task at the workstation, wherein the code is related to the specific type of machine or equipment at the workstation,
      an entry point defining an entrance position to the real workstation, and
      at least one predefined path to be followed by the robot when carrying out the task at the real workstation, and
   a user interface configured to provide information about the predefined workstations and to permit an operator to select a set of workstations from the predefined workstations and to specify, before execution of the work cycle, a desired part flow between the selected workstations, and
   a scheduling unit that carries out during execution of the work cycle:
      scheduling an execution order for the selected workstations based on the desired part flow and information about external events, wherein the system is configured to receive information about external events during execution of the work cycle and adapt the sched- uling of the execution order based on the information about external events during the work cycle, and controlling the movements of the robot based on the scheduled execution order and said predefined paths for the selected workstations.

2. The system according to claim 1, wherein the system receives information regarding a status of the workstations, and wherein said scheduling unit determines which of the workstations to be executed next based on a current status of the workstations.

3. The system according to claim 1, wherein the system provides a possibility to point out an alternative workstation to be executed if an ordinary workstation is not ready to be executed, and wherein said scheduling unit determines which of the workstations to be executed next based on pointed out alternative workstations.

4. The system according to claim 1, wherein the system provides a possibility to assign different priorities to the set workstations selected from the library of predefined workstations, and wherein said scheduling unit determines which of the workstations to be executed next based on the assigned priorities.

5. The system according to claim 1, wherein each of said predefined workstations comprises a model of a real workstation including a software object having an interface with at least one property, method or event, and wherein the object interacts with surroundings of the object through the at least one property, method and event.

6. The system according to claim 5, wherein said properties includes a status of the real workstation.

7. The system according to claim 5, wherein said properties include an alternative workstation to the real workstation.

8. The system according to claim 5, wherein said properties include a priority of the workstation.

9. The system according to claim 5, wherein said methods include at least one interrupt routine defining what to do when a specific interrupt signal arrives, and wherein said scheduling unit executes the at least one interrupt routine upon receiving the specific interrupt signal.

10. The system according to claim 5, wherein said at least one event includes an event that triggers on a change in a signal corresponding to a status of the real workstation and based thereon to update the status of the real workstation.

11. The system according to claim 1, wherein said predefined paths comprise a predefined station path defining the robot movement into and out of the workstation, and wherein the predefined station path comprises a first entrance path defining the robot movement from the entry point to a process point defined inside the workstation and an exit path defining the robot movement from the process point out of the workstation.

12. The system according to claim 11, wherein said predefined paths comprise at least one predefined process path defining the robot movement inside the workstation, and wherein the predefined station path comprises a second entrance path defining the robot movement from said first process point to a second process point defined inside the workstation and a second exit path defining the robot movement from the second target point back to the first process point.

13. The system according to claim 1, wherein said predefined paths comprise an array of predefined path points, and wherein said scheduling unit receives the path points from said array upon execution of the path.

14. The system according to claim 13, wherein said predefined path points comprise information about whether the point is a move-in or a move-out point, and the type of movement in the point.

15. The system according to claim 1, wherein said set of predefined workstations comprises at least one predefined work cell comprising:

an entry point of the work cell defining an entrance position to the work cell, and predefined paths to be followed by the robot between the entry points of the workstations, and predefined paths to be followed by the robot from each entry point of the workstations to the entry point of the work cell.

16. The system according to claim 15, wherein said predefined work cell comprises a model of the real work cell including a software object having an interface with at least one property, method or event, wherein the object interacts with surroundings through the at least one property, method or event, and wherein the software object of the cell has a same user interface as software objects of the workstations.

17. The system according to claim 15, wherein the scheduling unit upon receiving a fault interruption signal moves the robot out of the workstation and to the entry point of the work cell by moving the robot along said predefined paths in dependence on a current position of the robot.

18. The system according to claim 17, wherein the scheduling unit moves the robot along said predefined paths in dependence on at least one predefined rule.

19. The system according to claim 18, wherein the at least one predefined rule comprises, in case a failure occurs when the robot position is on the entrance path, wherein the robot will reverse on the entrance path, and wherein in case the failure occurs when the robot position is on the exit path, that the robot will continue to follow on the exit path.

20. The system according to claim 1, wherein the workstations comprise a die-casting application.

21. A method for controlling the movements of an industrial robot during a work cycle, wherein the robot visits and performs work on a plurality of workstations in a work cell during the work cycle, the method comprising:

storing a library of predefined workstations, each comprising:

a model of a real workstation including a specific type of machine or equipment, preprogrammed code designed to control the robot so that the robot carries out a defined task at the workstation, wherein the code is related to the specific type of machine or equipment at the workstation, an entry point defining the entrance position to the real workstation, and at least one predefined path to be followed by the robot when carrying out the task at the real workstation, wherein the method includes during programming of the robot displaying information about the predefined workstations on a user interface, allowing an operator to select a set of workstations from the predefined workstations and to specify a desired part flow between selected workstations, receiving information on selected workstations and a desired part flow between the selected workstations prior to execution of the work cycle, and scheduling an execution order for the selected workstations based on the desired part flow; and wherein the method includes during execution of the work cycle
receiving information about external events,
determining the execution order for the selected workstations based on the desired part flow, and said information about external events,
adapting the scheduling of the execution order based on the information about external events during the work cycle, and
moving the robot based on the scheduled execution order and said predefined paths for the selected workstations.

22. The method according to claim 21, further comprising:
receiving information regarding a status of the workstations and determining which of the workstations is to be executed next based on a current status of the workstations.

23. The method according to claim 21, further comprising:
pointing out an alternative workstation to be executed if an ordinary workstation is not ready to be executed, and
determining which of the workstations to be executed next based on the pointed out alternative workstation.

24. The method according to claim 21, further comprising:
assigning different priorities to the selected workstations, and
determining which of the workstations to be executed next based on the assigned priorities.

25. The method according to claim 21, wherein each of said predefined workstations comprises a model of a real workstation including a software object having an interface with at least one property, method or event, and wherein the object interacts with surroundings through the at least one property, method or event.

26. The method according to claim 25, wherein said properties include a status of the real workstation.

27. The method according to claim 25, wherein said properties include an alternative workstation to the real workstation.

28. The method according to claim 25, wherein said properties include a priority of the real workstation.

29. The method according to claim 25, wherein said methods include at least one interrupt routine defining what to do when a specific interrupt signal arrives, and wherein the at least one interrupt routine are executed upon receiving the specific interrupt signal.

30. The method according to claim 26, wherein said at least one event includes an event that triggers on a change in a signal corresponding to a status of the workstation and based thereon to update the status of the real workstation.

31. The method according to claim 21, wherein said predefined paths comprise a predefined station path defining the robot movement into and out of the workstation, wherein the predefined station path comprises a first entrance path defining the robot movement from the entry point to a process point defined inside the workstation and an exit path defining the robot movement from the process point and out of the workstation.

32. The method according to claim 31, wherein said predefined paths comprise at least one predefined process path defining the robot movement inside the workstation, and wherein the predefined station path comprises a second entrance path defining the robot movement from said first process point to a second process point defined inside the workstation and a second exit path defining the robot movement from the second target point back to the first process point.

33. The method according to claim 21, wherein said predefined paths comprise an array of predefined path points, and wherein retrieving the path points from said array upon execution of the path.

34. The method according to claim 33, wherein said predefined path points comprise information about whether the point is a move-in or a move-out point, and the type of movement in the point.

35. The method according to claim 21, further comprising:
defining at least one predefined work cell comprising:
an entry point of the work cell defining an entrance position to the work cell, and predefined paths to be followed by the robot between the entry points of the workstations, and
predefined paths to be followed by the robot from each entry point of the workstations to the entry point of the work cell.

36. The method according to claim 35, wherein said predefined work cell comprises a model of the real work cell including a software object having an interface with at least one property, method or event, and wherein the object interacts with surroundings through the at least one property, method or event, and wherein the software object of the cell has a same user interface as software objects of the workstations.

37. The method according to claim 35, further comprising:
upon receiving a fault interruption signal, moving the robot out of the workstation and to the entry point of the work cell by moving the robot along said predefined paths in dependence on a current position of the robot.

38. The method according to claim 37, wherein, upon receiving said fault interruption signal, the robot is moved along said predefined paths in dependence on at least one predefined rule.

39. The method according to claim 38, wherein the at least one predefined rule comprises, in case a failure occurs when the robot position is on the entrance path, wherein the robot will reverse on the entrance path wherein, in case the failure occurs when the robot position is on the exit path, the robot will continue to follow on the exit path.

40. A computer program product, comprising:
a non-transitory computer readable medium; and
computer program instructions recorded on the computer readable medium and executable by a processor for carrying out a method for controlling the movements of an industrial robot during a work cycle including visiting and performing work on a plurality of workstations in a work cell, the method comprising:
storing a library of predefined workstations, each comprising:
a model of a real workstation including a specific type of machine or equipment,
preprogrammed code designed to control the robot so that the robot carries out a defined task at the workstation, wherein the code is related to the specific type of machine or equipment at the workstation,
an entry point defining the entrance position to the real workstation, and
at least one predefined path to be followed by the robot when carrying out the task at the real workstation,
wherein the method includes during programming of the robot
displaying information about the predefined workstations on a user interface, allowing an operator to select a set of workstations from the predefined workstations and to specify a desired part flow between selected workstations, and receiving information on selected workstations and a desired part flow between the selected workstations prior to execution of the work cycle; and wherein the method includes during execution of the work cycle receiving information about external events, determining the execution order for the selected workstations based on the desired part flow, and said information about external events, adapting the scheduling of the execution order based on the information about external events during the work cycle, and moving the robot based on the scheduled execution order, the preprogrammed robot code, and said predefined paths for the selected workstations.

41. The method according to claim 21, further comprising: carrying out a die-cast application.

\* \* \* \* \*